MELCHI SCOTT.
Improvement in Blacksmith's Forges.
No. 123,202.  Patented Jan. 30, 1872.
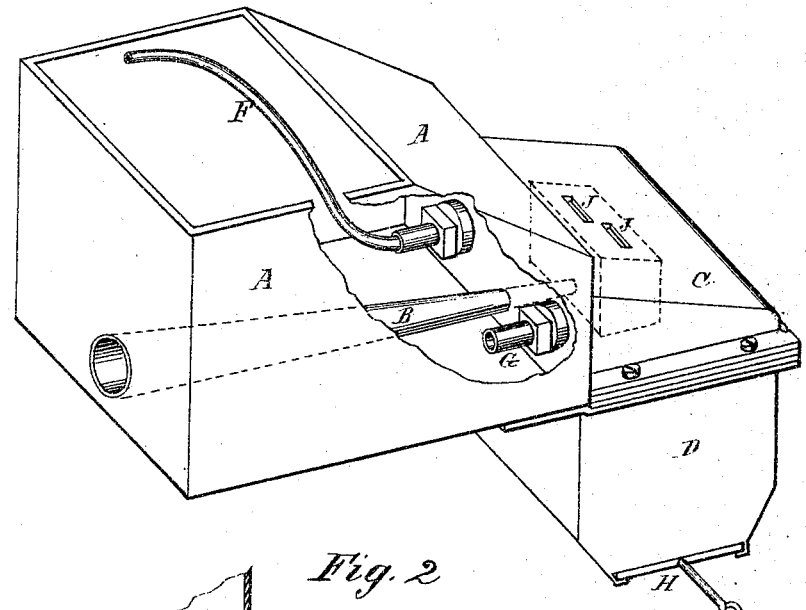
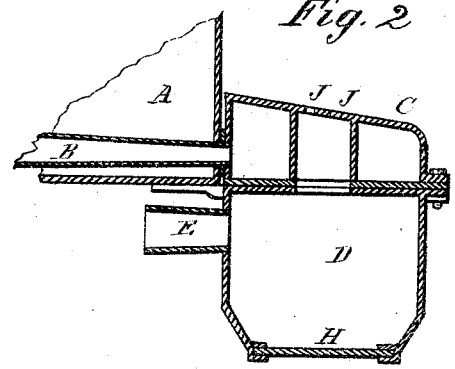
Witnesses  Inventor 123,202

UNITED STATES PATENT OFFICE.

MELCHI SCOTT, OF FAIRFIELD, IOWA.

IMPROVEMENT IN BLACKSMITHS' FORGES.

Specification forming part of Letters Patent No. 123,202, dated January 30, 1872.

*To all whom it may concern:*

Be it known that I, MELCHI SCOTT, of the city of Fairfield, county of Jefferson and State of Iowa, have invented certain new and useful Improvements in Blacksmiths' Tuyeres; and I do hereby declare that the following is a full, clear, and exact description thereof, reference being had to the accompanying drawing and to the letters of reference marked thereon making a part of this specification; and to enable others skilled in the art to make and use my invention, I will proceed to describe its construction and operation.

*Description of the Accompanying Drawing.*

In the drawing, the side of the water-tank is represented as cut away in order more clearly to show the internal arrangement of the invention.

*General Description.*

A A is the water-tank or reservoir, and should be made of cast iron. B is a conical tube, into which the bellows-pipe or nozzle is inserted. C is the fire, water, and blast box. D is the ash-box. E is an extra tube underneath the fire, water, and blast box. F is an escape or discharge tube. G is a tube for conducting the water from the tank A A to the fire, water, and blast box C. H is a slide-valve for discharging the ashes coming through the openings J J through the fire, water, and blast box C into the ash-box D. For common blacksmithing purposes the nozzle of the bellows is inserted in the conical tube B; but where heavy blasting is required the bellows' nozzle is inserted in the tube E and more chambers are added to the fire, water, and blast box C, with corresponding openings in the top of the box. The fire, water, and blast box C is connected with the ash-box D by means of screws, with leather, rubber, or other desirable packing between the boxes. On the ends of the tubes F and G there is a thread-cut which screws into the side of the fire, water, and blast box C. These tubes are made water-tight by means of leather or rubber washers and nuts on the inside of the tank A A. When it is desired to remove the ashes from the ash-box D, the slide-valve H is drawn out, when the ashes will fall through. J J are openings in the top of the fire, water, and blast box C through which the air or blast from the bellows is brought in contact with the fire and fuel on the top of the fire, water, and blast box C. When the tank A A is filled with water, the conducting-tube G fills the water-space (indicated by the dotted lines) in the fire, water, and blast box C for the purpose of keeping cool said box, so that the cinders or slag will not adhere to the top of the box C, and so that the blast is perfectly free. The crooked discharging-tube F is for the discharge of the hot water and steam from the fire, water, and blast box C.

*Claim.*

Having thus fully described my invention, what I claim, and desire to secure by Letters Patent, is—

The combination, viz., the fire, water, and blast box C in connection with the ash-box D, both being combined with the tank A A, as herein described.

MELCHI SCOTT.

Witnesses:
 J. M. SHAFFER,
 B. S. McELHINNY.